United States Patent [19]

Marchioni

[11] Patent Number: 4,662,273

[45] Date of Patent: May 5, 1987

[54] GREASELESS COOKER FOR FOOD ITEMS

[76] Inventor: Barbara K. Marchioni, 704 Faucette St., Fuquay Varina, N.C. 27526

[21] Appl. No.: 796,081

[22] Filed: Nov. 7, 1985

[51] Int. Cl.⁴ ............................................. A47J 37/04
[52] U.S. Cl. ....................................... 99/426; 99/440; 99/446; 99/447; 99/449; 219/386; 219/433; 219/521; 219/524; 426/523
[58] Field of Search .................. 99/440, 446, 426, 450, 99/449, 447; 219/524, 525, 433, 436, 521, 386, 387; 426/523

[56] References Cited

U.S. PATENT DOCUMENTS

| | | |
|---|---|---|
| 462,929 | 11/1891 | Long . |
| 481,337 | 8/1892 | Warthen . |
| 1,650,634 | 11/1927 | Lutzler .................................. 99/446 |
| 3,010,383 | 11/1961 | Greene .............................. 99/446 X |
| 3,252,407 | 5/1966 | Buerki .................................. 99/446 |
| 3,292,528 | 12/1966 | Myler . |
| 3,358,588 | 12/1967 | Rossnan . |
| 3,678,844 | 7/1972 | Marshall ........................... 99/446 X |
| 3,683,155 | 8/1972 | Loofbourow ........................ 219/521 |
| 3,719,507 | 3/1973 | Bardeau . |
| 3,727,875 | 4/1973 | Downing . |
| 3,948,159 | 4/1976 | Vigerstrom . |
| 4,092,909 | 6/1978 | Phillips . |
| 4,297,941 | 11/1981 | Gallina . |
| 4,512,250 | 4/1985 | Schindler . |

FOREIGN PATENT DOCUMENTS 1078637 6/1980 Canada .................................. 99/440
1559976 1/1980 United Kingdom ................ 219/521

Primary Examiner—Billy J. Wilhite
Attorney, Agent, or Firm—Bell, Seltzer, Park & Gibson

[57] ABSTRACT

A device for cooking fatty foods such as meat balls or other foods which are characterized by the production of liquid fat during the cooking process is disclosed. A pan having a bottom and upstanding side walls is provided. A removable heat-conductive tray is adapted to be supported in spaced relationship above the bottom of the pan. The tray includes a plurality of food supporting cavities and the bottom of each cavity is provided with a drain for permitting liquids removed from the food during cooking to drain into the bottom of the pan. Removable electric resistance heating means is adapted to be supported beneath the tray in heat conductive relation therewith for conducting heat to and throughout the tray sufficient to cook the food in the cavities, the heating means underlying the tray and positioned above the level of the drains so as to provide unrestricted passage of liquids emanating from food being cooked in the cavities for the drains to the bottom of the pan.

11 Claims, 8 Drawing Figures

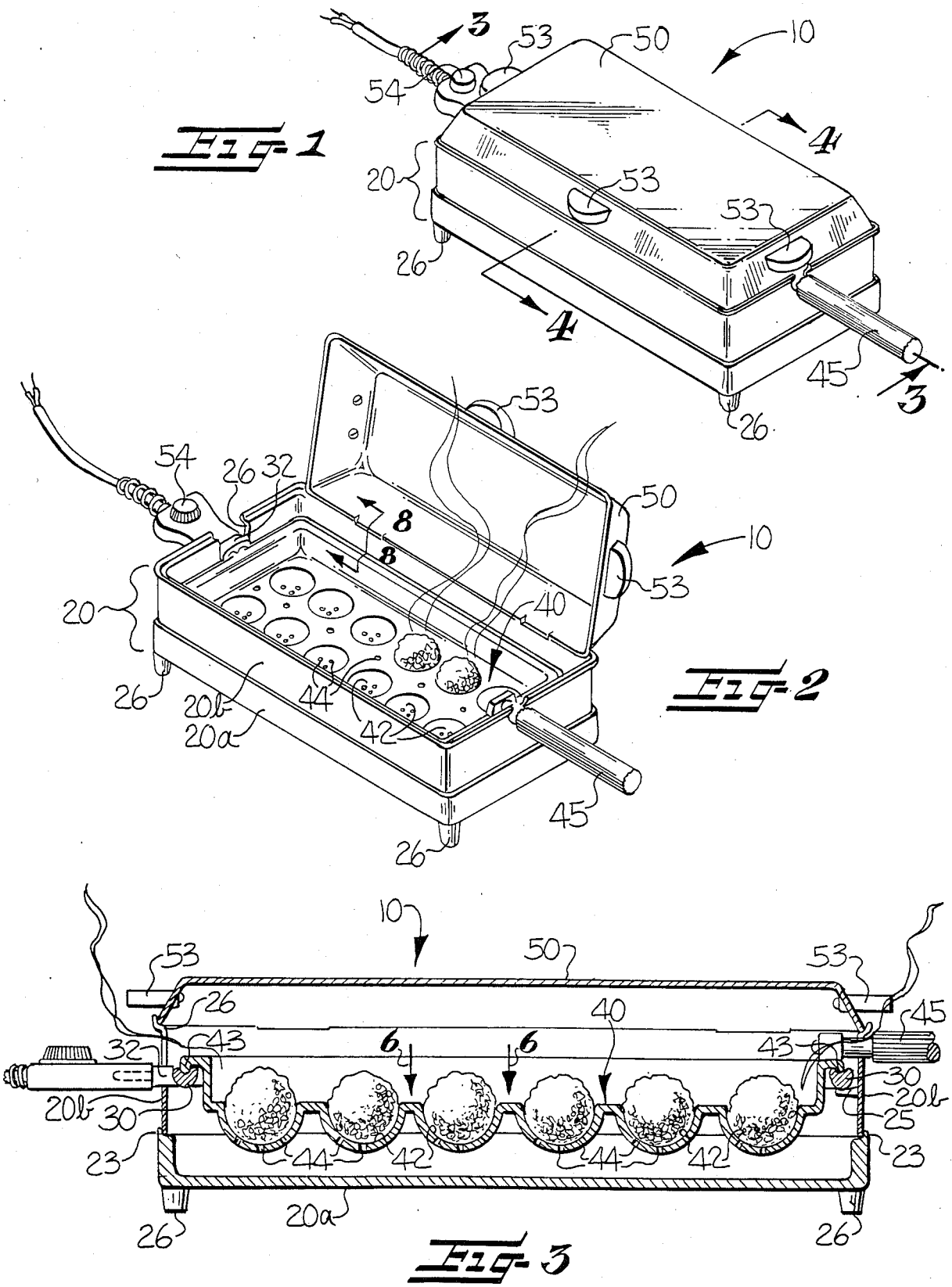

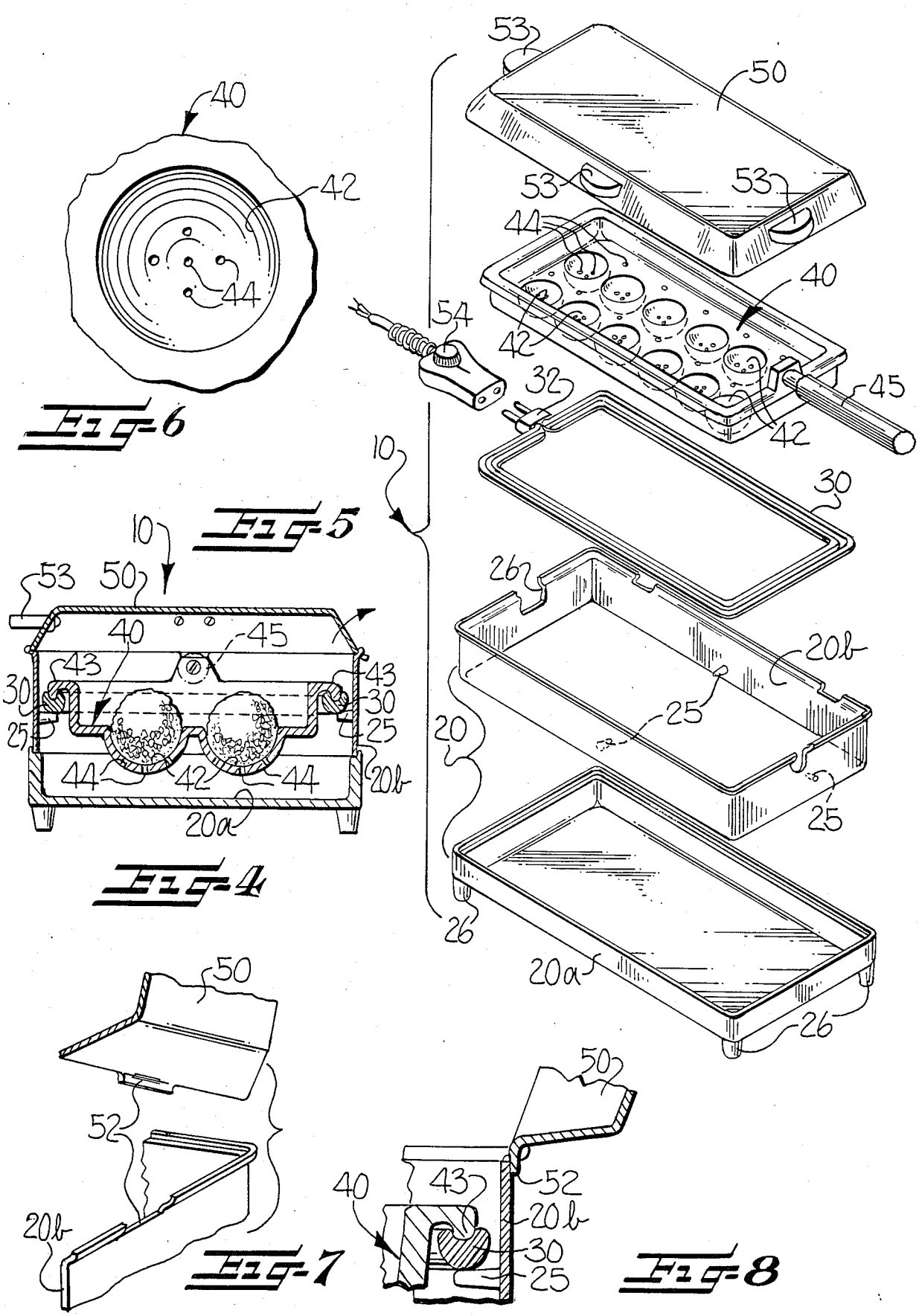

GREASELESS COOKER FOR FOOD ITEMS

FIELD OF THE INVENTION

This invention relates generally to the greaseless cooking of food items and more particularly concerns the greaseless cooking of meatballs or the like.

BACKGROUND AND SUMMARY OF THE INVENTION

Ground meat such as beef, pork, veal, etc. or combinations thereof formed into balls, generally known as meatballs, are common ingredients required in the recipes for many food dishes. Current practice in preparing meatballs is to divide a quantity of the ground meat into round portions and to cook them in their own grease in a frying pan.

This method has a number of disadvantages, such as the splattering of the grease rendered from the meatballs which causes a messy cooking area as well as injury to the cook, should the grease land on exposed skin, not to mention the soiling of clothing should any of the cooking grease or other juices land thereon.

Furthermore, another drawback of the present method of cooking meatballs in their own grease arises out of the growing preference of many individuals for minimizing the fat content of the foods that they consume. Meatballs cooked according to the present state of the art can contain a substantial amount of grease which is not otherwise removable without additional processing steps. In addition, substantial amounts of grease are often rendered from the meatballs during cooking. This grease collects in the frying pan, in close proximity to the heater, and since it is not allowed to cool, it may smoke or even burn.

Furthermore, many preparers of such recipes prefer to achieve an even overall browning effect of the meatballs, for aesthetic as well as reasons of taste. This is difficult or impossible to achieve according to present frying methods.

In accordance with the foregoing, it is an object of this invention to overcome the deficiencies outlined by providing an apparatus capable of producing cooked food items having an even overall browned exterior with substantially greaseless cooking and without any appreciable splattering of grease into the work area or onto the cook.

Another object of the invention is to provide an apparatus which drains grease and cooking juices rendered during cooking away from the food item and the heater in order to prevent burning thereof.

Another object of the invention is to provide an apparatus which accomplishes the above and which is also easy to clean.

These and other objects are accomplished by generally providing a pan which has a bottom and upstanding side walls. A removable tray is adapted to be supported in spaced relationship above the bottom of the pan. The tray includes a plurality of food supporting cavities wherein the food is placed and each cavity includes a drain for allowing the grease to be carried away from the source of heat to thereby prevent smoking or burning. A removable electric resistance heater is supported beneath the tray is heat conductive contact therewith sufficient to cook the food contained therein. The heater is positioned so as to underlie the tray, but is positioned above the level of the drain to allow unrestricted flow of the grease emanating from the cavities to the bottom of the pan.

In addition, the apparatus includes a top cover which is hingedly connected to the pan for covering the tray to increase heat transfer efficiency to the food and to prevent the grease from escaping while the food is cooking. Furthermore, to aid in cleaning, the interior of the apparatus may be coated with a nonstick surface. A further feature of the invention resides in the tray which is adapted to overlie the heater and which is easily removable from its position above the heater to provide access to the inside of the pan for cleaning.

BRIEF DESCRIPTION OF THE FIGURES

FIG. 1 is a perspective view of the cooker with the top cover closed.

FIG. 2 is a perspective view of the cooker with the top cover open and showing the interior of the cooker.

FIG. 3 is a longitudinal section view of the cooker, taken along line 3—3 of FIG. 1, and showing meatballs being cooked.

FIG. 4 is a transverse section view of the cooker, taken along line 4—4 of FIG. 1, and showing meatballs being cooked.

FIG. 5 is an exploded perspective view of the cooker.

FIG. 6 is a fragmentary plan view of a single depression in the tray taken along line 6—6 of FIG. 3 and showing the drain.

FIG. 7 is an exploded fragmentary view of the hinge between the top cover and the pan.

FIG. 8 is a fragmentary section view taken along line 8—8 of FIG. 2 showing the tray being supported by the heater.

DETAILED DESCRIPTION OF THE ILLUSTRATED EMBODIMENT

While the present invention will be described more fully hereinafter with reference to the accompanying drawings, in which a particular embodiment is shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

The illustrated preferred embodiment of the present invention, generally indicated at 10, comprises a pan 20 serving as a bottom to the apparatus, a heater 30, a tray 40, and a top cover 50.

The pan 20 may be of a single or two piece construction. The pan illustrated includes a bottom 20a and vertically upstanding sidewalls 20b which extend approximately ½ inch from the bottom of pan 20a to form a trap for the liquids and grease produced during cooking. The upper edges of pan 20a extend slightly outward to form a lip 23 which accommodates the intermediate section 20b of the sidewalls which is restingly received by the earlier mentioned lip 23. The two piece construction of pan 20 is preferred for ease of cleaning. In addition, pan 20 includes legs 26 which may be integrally formed or attached to the bottom of the pan by suitable means such as screws, etc. near each of its corners for spacing apart the bottom of the pan 20 which is hot during cooking, from the surface upon which it rests in order to prevent damage thereto. Pan 20 is also provided with a ledge 25, bracket or other means suitable for supporting a heating means (best shown in FIG. 8) as will be described hereinbelow.

The cooker is also provided with heating means 30 (best illustrated in FIGS. 7 and 8.) Intermediate section 20b of the pan 20 is provided with an appropriate slot type opening 26 in the side wall of pan 20 through which plug 32 extends to deliver a suitable electrical current thereto for the cooking of the food. It is contemplated that in the present preferred embodiment the heating means is of the resistance type and is shaped so as to closely follow the inner peripheral edge of pan 20 being suitably spaced apart therefrom and supported by ledge 25. The outer surface of the heating means 30 has along at least portions of its length, a U-shaped cross-section. It will be noted however, that the aforementioned U-shaped cross-section is not essential to the operation of the present invention and that it is operative with other cross-sectional profiles. Furthermore, depending on the tray design (to be discussed hereinbelow) the heating means may interlace the various cavities therein in order to achieve a more even heat distribution and to provide additional support thereto, should the same be necessary. In addition, an optional rheostat 54 or variable current control may be included in the heating means circuit for varying the amount of heat delivered to the tray and the food items contained therein. Rheostats are well known in the art and the adaption of such a circuit element to the present invention is well known.

The tray 40 may be formed of any suitable heat conducting material such as metal, heat reaistant plastic or porcelain. Ideally, the entire outer surface of tray 40 is covered with a synthetic resin polymer exhibiting nonstick characteristics such as "Teflon" or other suitable materials. Tray 40 includes a plurality of cavities 42 for receiving food items to be cooked and has a downwardly extending lip 43 which rests in conductive heat transfer relation on heater 30 while the device is in operation (FIGS. 4 and 8). Each of the cavities 42 as well as the upper surface of the tray includes one or more drain openings 44 as may be appropriate for the food to be cooked. However, the drain openings should be of sufficient size so as to allow the liquids and grease to drain down into pan 20 but small enough to prevent splattering back in the upward direction and in an alternate embodiment (not shown), may be cone shaped, with the small end facing the bottom of pan 20. The cavities 42 in the tray may be sized according to the type of food item to be cooked. For example, trays may be interchangeable with different size cavities and variations in the number of cavities so that for example, cocktail meatballs and spaghetti meatballs may be cooked in the cooker merely by interchanging trays. The tray 40 also includes a handle 45 affixed by suitable means thereto at one of its ends for aiding in the manipulation thereof.

The cooker 10 also includes a top cover 50 which is hingedly connected to pan 20 by a hinge 52 having one of its ends on the top cover and the other end on the intermediate section 20b of the pan 20. The cover also includes handles 53 which facilitate handling the same. The top cover 50 is pivotable about the hinge 52 from a closed position overlying and covering the tray 40 and any food items to be cooked, and is movable to a substantially vertical position wherein manipulation and removal of the food items from the tray 40 can be easily effected. It is contemplated that at the surface of the top cover 50 which faces the food items will also be provided with a non-stick surface as described above for ease of cleaning. In addition, top cover 50 and hinge 52 are connected so that the top cover is removable from the pan 20 to facilitate cleaning.

In the operation of the device, electricity is supplied to the plug 32 and the temperature of the heating means may be regulated if the optional rheostat 54 described above is provided. Food is placed in the cavities and the tray 40 is then placed on the heating means such that the lip 43 of the tray rests in conductive heat transfer location on the U-shaped heating means. The cover 50 may then be moved to the closed position for a period of time sufficient to permit temperature buildup within the apparatus in order to facilitate cooking. The food may be checked by lifting the top cover 50 by handle 53 and simple implements such as a fork may be used to turn the food so as to rotate the surface which is exposed to the greatest heat and to obtain an overall browning effect of the food, if desired.

When it has been determined that the food in the cavities is cooked, each food item may be indivdually removed or the tray may be removed by gripping and lifting handle 44 and moving the food items to a container for storage prior to consumption. Upon completion of the cooking process, electricity is removed from the heating means and the cooker is allowed to cool. It may then be completely disassembled by removal of top cover 50, heating means 30 and intermediate section 20b from the bottom section 20a of pan 20 for cleaning and storage of the cooker until its next use.

In the drawings and specification, there has been set forth a preferred embodiment of the invention, and although specific terms are employed they are used in a generic and descriptive sense only and not for the purposes of limitation.

What is claimed is:

1. A device for cooking fatty foods such as meatballs or the like, which foods are characterized by producing liquid fat during cooking, said device comprising
   a pan having a bottom and upstanding side walls,
   a removable heat-conductive tray in spaced relationship above the bottom of said pan, said tray having a plurality of food supporting cavities, each provided with a drain in the bottom thereof for permitting liquids removed from the food during cooking to drain into the bottom of the pan;
   removable electric resistance heating means beneath said tray in heat-conductive relation therewith for conducting heat to and throughout the tray sufficient to cook the food contained in said cavities, said heating means underlying said tray and positioned above the level of the drains so as to provide unrestricted passage of liquids emanating from food being cooked in said cavities from said drains to the bottom of said pan,
   said heating means including a depression along its upper surface and said tray including a corresponding downwardly projecting lip extending along its outer peripheral edge, said lip being restingly received in said depression during cooking of the food,
   whereby liquid fat emanating from the food during cooking is drained away from the food while being kept out of contact with said resistance heating means.

2. An apparatus according to claim 1 further including means for regulating current supplied said to heating means.

3. An apparatus according to claim 2 further including a top cover adapted to overlie said pan and hingedly connected thereto.

4. An apparatus according to claim 1 wherein said heating means and said tray are in heat conductive contact with each other.

5. An apparatus according to claim 1 further including a top cover adapted to overlie and cover said tray and said pan for preventing grease and heat from escaping while the food is cooking.

6. An apparatus according to claim 1 wherein said pan and said tray have surfaces which are essentially non-stick surfaces for aiding in cleaning the apparatus after the food has been cooked.

7. An apparatus according to claim 1 wherein at least portions of said sidewalls of said pan are detachable for facilitating the cleaning thereof.

8. An apparatus according to claim 1 wherein said pan side walls define an inner surface and wherein said heating means is shaped to follow said inner surface of said pan along substantial portions of its length and is spaced apart therefrom.

9. An apparatus according to claim 1 further including a handle mounted to said tray for aiding in the proper positioning thereof on the heating means.

10. A device for cooking fatty foods such as meatballs or the like, which foods are characterized by producing liquid fat during cooking, said device comprising:
   a pan having a bottom and detachable upstanding side walls, for facilitating the cleaning thereof,
   a removable heat-conductive tray in spaced relationship above the bottom of said pan, said tray having a plurality of food supporting cavities, each provided with a drain in the bottom thereof for permitting liquids removed from the food during cooking to drain into the bottom of the pan, said tray including a downwardly projecting lip along its outer peripheral edge, and a handle for aiding in the proper positioning thereof,
   removable electric resistance heating means beneath said tray including a depression along its upper surface positioned in heat conductive contact with the lip of said tray for conducting heat to and throughout the tray sufficient to cook the food contained in said cavities, said heating means underlying said tray and positioned above the level of the drains so as to provide unrestricted passage of liquids emanating from food being cooked in said cavities from said drains to the bottom of said pan,
   whereby liquid fat emanating from the food during cooking is drained away from the food while being kept out of contact with said resistance heating means.

11. A device for cooking meatballs in such a fashion as to reduce splattering of grease during the cooking operation and to produce cooked meatballs having a reduced fat content and a generally browned surface effect, said device comprising:
   a two-part pan structure including a lower part having a bottom surface and upstanding sides for holding liquids and grease produced during cooking, and an upper part resting upon the upstanding sides of said lower part so as to form a continuation of the upstanding sides, said upper part having inwardly projecting support means adapted to support a heating means thereon;
   heating means configured so as to closely follow the inner periphery of the pan structure upper part and being supported in inwardly spaced relation therefrom by said support means;
   a tray formed of heat conducting material, said tray including a plurality of cavities for holding meatballs therein, drain opening means associated with each cavity, said drain opening means being sized to permit liquids and grease to drain therethrough to the pan bottom surface while being small enough to reduce splattering back in the upper direction;
   cooperative lip and groove means associated with the upper surface of said heating means and the peripheral underside of said tray to facilitate location of the tray in heat conductive relationship with said heating means such that liquids and grease emanating from the meatballs being cooked have unrestricted passage to the pan bottom;
   said two-part pan structure, heating means and tray being configured as recited to provide a vertically nesting device that can be easily assembled, disassembled and cleaned.

* * * * *